J. W. NORCROSS.
Tackle-Block.

No. 211,421.　　　　Patented Jan. 14, 1879.

WITNESSES:
Joseph A. Miller Jr
William L. Coop.

INVENTOR:
Joseph W. Norcross
by Joseph A. Miller
Attorney

UNITED STATES PATENT OFFICE.

JOSEPH W. NORCROSS, OF BOSTON, MASSACHUSETTS.

IMPROVEMENT IN TACKLE-BLOCKS.

Specification forming part of Letters Patent No. 211,421, dated January 14, 1879; application filed June 7, 1878.

*To all whom it may concern:*

Be it known that I, JOSEPH W. NORCROSS, of Boston, in the county of Suffolk and State of Massachusetts, have invented certain new and useful Improvements in Tackle-Blocks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention has reference to improvements in tackle-blocks; and consists in the peculiar and novel arrangement for distributing the strain on the sheave-axles and relieving the friction on the axle, all of which will be more fully set forth hereinafter, and pointed out in the claim.

Figure 1:
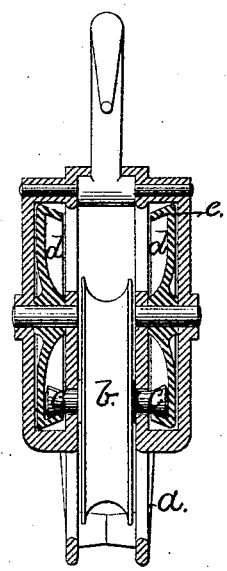
Figure 2:
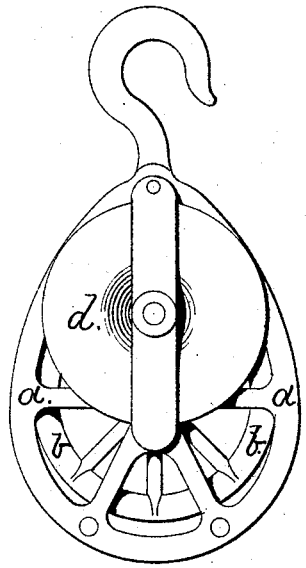

Figure 1 is a sectional view of my improved tackle-block, showing the bearings of the axle resting on the rim of the anti-friction wheels. Fig. 2 is a side view of the same.

In the drawings, $a$ is the block-frame; $b$, the block-sheave, and $c$ the axle of the same. This axle passes through holes in the block-frame, not to form the bearings, but to merely guide the same and maintain a central position. $d\ d$ are two anti-friction disks, of large diameter, supported on axles above and nearer the upper end of the block-frame than the sheave-axle. The disks $d\ d$ are provided with inwardly-projecting rims $e\ e$, on which the sheave-axle is supported. The sheave-axle is provided on each end with tapering enlargements, and the rims $e$ are made tapering toward the center, so that the axle will rest firmly on the rims and roll on the same without exerting any lateral thrust.

Instead of the conical enlargement at the ends of the axle $c$, and the corresponding conical bearing-rim $e$ on the disks $d$, both the axle and rims may be made straight or have other forms that will insure a firm bearing of the axle on these rims, and allow the axle to roll on the rims and rotate the anti-friction disks.

By locating the bearings of the disks $d$ above and nearer the upper end of the block-frame the strain on the sheave is transmitted to the upper end and greater strength secured.

This anti-friction bearing is applicable to other purposes than tackle-blocks. It acts upon the principle, first, of substituting rolling resistance for friction and of rolling upon a surface itself rolling; next, upon the fact that as the diameter of the main axle is to the diameter of the bearing flanges or rims of the disks $d$ so is the speed of the axles on which the weight rests diminished and the resistance diminished with speed, as by the law of Morin "the re-effect of friction is proportional to the velocity." For all purposes, therefore, where the large disks $d$ can be applied to sustain the shaft this anti-friction device may be used; and in all cases where high speed in the axle is required, such as the rope-sheaves in transmitting power, this device is peculiarly valuable—first, because it reduces the friction and velocity on the bearings; and, second, by the peculiar arrangement of the ends of the axle and the bearing-rims, all lateral motion and friction are avoided, and the main pulley, (in the drawings the sheave $b$,) while perfectly free from all binding effect, must run true and without friction.

Having thus described my invention, I claim as new and desire to secure by Letters Patent—

The combination, with the shaft $c$, provided with tapering ends, of the disks $d$, provided with the rims $e$, the inner bearing of which corresponds with the ends of the shaft, substantially as and for the purpose set forth.

In testimony that I claim the foregoing as my own I affix my signature in presence of two witnesses.

JOSEPH W. NORCROSS.

Witnesses:
 JOSEPH A. MILLER,
 JOSEPH A. MILLER, Jr.